US009021545B2

(12) United States Patent
Deter et al.

(10) Patent No.: US 9,021,545 B2
(45) Date of Patent: Apr. 28, 2015

(54) METHOD AND SYSTEM TO SECURE A COMPUTING DEVICE

(75) Inventors: Matthew Deter, Rocklin, CA (US); Douglas T. Albright, Rocklin, CA (US); Kimberly G. Drongesen, Granite Bay, CA (US); John K. Gonsalves, Roseville, CA (US); Daryl Wong, Sacramento, CA (US); Shivaun Albright, Rocklin, CA (US)

(73) Assignee: Hewlett-Packard Development Company, L.P., Houstion, TX (US)

(*) Notice: Subject to any disclaimer, the term of this patent is extended or adjusted under 35 U.S.C. 154(b) by 523 days.

(21) Appl. No.: 12/873,230

(22) Filed: Aug. 31, 2010

(65) Prior Publication Data

US 2012/0054820 A1   Mar. 1, 2012

(51) Int. Cl.
G06F 21/00 (2013.01)
G06F 21/60 (2013.01)

(52) U.S. Cl.
CPC ............ *G06F 21/604* (2013.01); *G06F 21/608* (2013.01)

(58) Field of Classification Search
USPC .............. 726/1–30; 713/1–152, 164–167, 713/187–194; 717/120–135
See application file for complete search history.

(56) References Cited

U.S. PATENT DOCUMENTS

| 8,078,909 B1 * | 12/2011 | Satish ........................... 714/15 |
| 8,286,219 B2 * | 10/2012 | Khalid et al. ................... 726/1 |
| 2002/0133710 A1 * | 9/2002 | Tarbotton et al. ............. 713/188 |
| 2005/0071668 A1 * | 3/2005 | Yoon et al. ..................... 713/200 |
| 2008/0172713 A1 | 7/2008 | Kamendje et al. |
| 2008/0276295 A1 * | 11/2008 | Nair ................................. 726/1 |

FOREIGN PATENT DOCUMENTS

| EP | 1895399 | 3/2008 |
| JP | 11167471 A | 6/1999 |
| JP | 2007034492 A | 2/2007 |
| WO | WO2008068882 A1 | 6/2008 |

OTHER PUBLICATIONS

Mayer, Alain, Avishai Wool, and Elisha Ziskind. "Fang: A firewall analysis engine." Security and Privacy, 2000. S&P 2000. Proceedings. 2000 IEEE Symposium on. IEEE, 2000.*
"HP Secure Print Advantage" Hewlett-Packard Development Company, L.P.; Jan. 2007; 8 pages.
Wahshefi, Luay A.; "Security Policy Development: Towards a Life-Cycle and Logic-Based Verification Model"; American Journal of Applied Sciences; Sep. 2008; 3 page.
Chae, Jongwoo et al; "An Adaptive Security Model for Heterogeneous Networks Using MAUT and Simple Heuristics"; 2004; 2 pages.

* cited by examiner

*Primary Examiner* — Madhuri Herzog
(74) *Attorney, Agent, or Firm* — Mannava & Kang, P.C.

(57) ABSTRACT

In one embodiment, a first instruction prescribing a setting for a feature is defined. A second instruction prescribing a first action is defined. A third instruction prescribing a second action is defined. It is determined whether the feature is present in a computing device, and if present, whether the feature is set to the setting. The first action is initiated if the feature is present and not set to the setting. The second action is initiated if the feature is not present.

13 Claims, 7 Drawing Sheets

METHOD AND SYSTEM TO SECURE A COMPUTING DEVICE

BACKGROUND

Failure to effectively secure a fleet of computing devices can be costly for an enterprise. Highly sensitive data (e.g. work product and contact information) may be lost through a security breach. Additional costs attributable to a security breach can include damage to the reputation of the enterprise and lost business opportunities.

BRIEF DESCRIPTION OF THE DRAWINGS

The accompanying drawings illustrate various embodiments and are a part of the specification. The illustrated embodiments are merely examples and do not limit the scope of the claims. Throughout the drawings, identical reference numbers designate similar, but not necessarily identical elements.

The same part numbers designate the same or similar parts throughout the figures.

DETAILED DESCRIPTION OF EMBODIMENTS

Securing a fleet of computing devices of disparate makes and models (hereinafter sometimes referred to as a "heterogeneous fleet") can be expensive and difficult to implement. The fleet may consists of a number of device models, supplied by different manufacturers. Further, even if there is a common manufacturer, the models may be released to the market over time such that newer devices typically support more features than older devices.

A network administrator for an enterprise may not want to be exposed to the details of each individual model in a heterogeneous fleet of computing devices. One approach to avoid creating separate polices and accounting for each device's feature set is to utilize a common security policy to each device within the heterogeneous fleet, and treat missing or unsupported security features as acceptable deviations from the policy. This approach succeeds in creating a uniform configuration across the devices, but can be error prone. Taking a position as to the significance of an absence of a feature without device specifics does not always create a secure configuration. Some device features and configurations reduce the security of the device, and should be turned off. If these features are missing from a device, it is acceptable from a security perspective, because the feature needs to be turned off to be secure. But other features in a device increase the security of a device. If this feature if missing, it can be unacceptable from a security perspective because the feature is needed to meet the security level set by the policy. In addition, the specific settings, values or semantics used to turn a feature on or off may vary on the devices. Various embodiments of the present disclosure were developed in an effort provide a method and a system to secure a heterogeneous fleet of computing devices in a manner that allows for the application of a uniform security policy, yet accounts for features that are not available on all devices within the fleet.

The following description is broken into sections. The first, labeled "Environment", describes an example environment in which embodiments may be implemented. The second section, labeled "Components", describes various physical and logical components utilized to implement various embodiments. The third section, labeled as "Operation", describes steps taken to implement various embodiments. The fourth section, labeled "Example", describes an example implementation of the disclosed method and system to secure a computing device.

Figure 1:
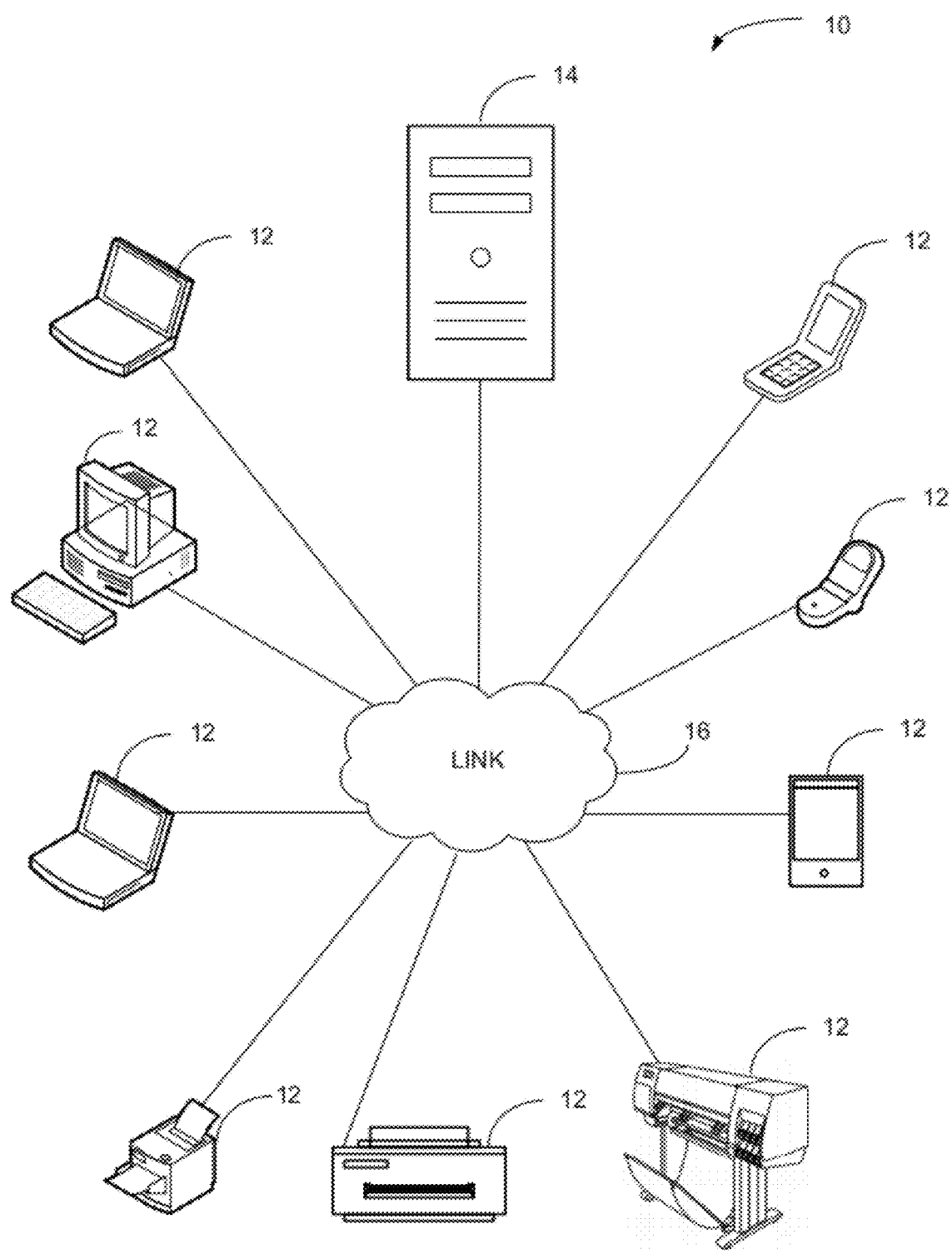
FIG. 1 depicts an example environment in which various embodiments may be implemented.

ENVIRONMENT: FIG. 1 depicts an example environment 10 in which various embodiments may be implemented. Environment 10 is shown to include computing devices 12 and server 14 interconnected via link 16. Computing devices 12 represent generally any computing device capable of sending networks requests to and otherwise communicating with server 14. Examples include desktop computers, laptop computers, smart phones, cell phones, digital tablet computers, personal digital assistants, net-books, digital media players, scanners, printers and the like.

Server 14 represents generally any computing device, or multiple computing devices, capable of receiving and responding to network requests from computing devices 12 via link 16. As discussed with reference to FIGS. 2 and 3 below, server 14 may be a management server operable to control a plurality of computing devices. In some embodiments, the server 14 may be a configuration management server or operations management server that also hosts applications relating to computing device operations other than security operations. For example, server 14 may be an operation management server that monitors media supply, ink or toner supplies and other operations within a fleet of printer computing devices in addition to monitoring security issues with respect to such devices. In another embodiment, server 14 may a management server operable to control multiple aspects of a fleet of mobile communication devices such as smart phones, with one of the aspects being device security. In other embodiments, server 14 may be a security management server that is dedicated to the task of controlling security settings and operations within a set of computing devices. In embodiments, server 14 is configured to host and run a security management software application that refers to a security policy, the security policy residing on server 14.

Computing devices 12 and server 14 are interconnected via link 16. Link 16 represents generally one or more of a cable, wireless, fiber optic, or remote connection via a telecommunication link, an infrared link, a radio frequency link, or any other connectors or systems that provides electronic communication. Link 16 may include, at least in part, an intranet, the interne, or a combination of both. Link 16 may also include intermediate proxies, routers, switches, load balancers, and the like. The paths followed by link 16 between computing devices 12 and server 14 as depicted in FIG. 1 represent the logical communication paths between these devices, not necessarily the physical paths between the devices.

Figure 2:
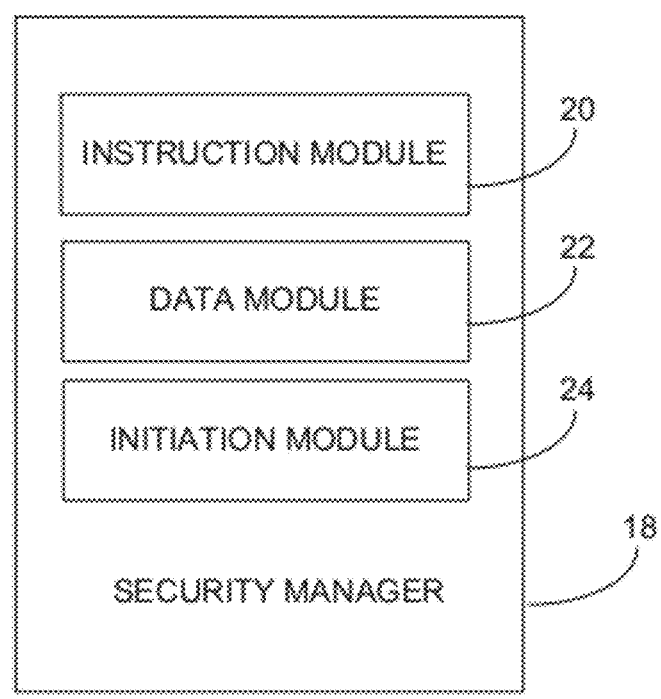
FIG. 2 depicts an example security manager according to an embodiment.

COMPONENTS: FIG. 2 depicts an example of a security manager 18. Security manager 18 represents generally any combination of hardware and programming configured for use to secure a computing device. In the example of FIG. 2, security manager 18 is shown to include an instruction module 20, a data module 22 and an initiation module 24.

Instruction module 20 represents generally any combination of hardware and programming configured to define a first instruction, the first instruction prescribing a setting or value that a feature should be set to or assigned. In an embodiment, the first instruction, after being defined, may be stored in computing device memory. As used in this specification and the appended claims, a "feature" of a computing device means a distinguishing characteristic or attribute of that computing device. As used in this specification and the appended claims, a reference to a feature of a computing device may be a reference to a distinguishing characteristic or attribute of hardware and/or software than may be run on that computing device. For example, a reference to a network port configuration feature of a computing device relates to both the computing device's hardware and software.

Instruction module 20 is additionally configured to define a second instruction that prescribes or orders a first action to be taken if the feature is present in a computing device and not set to the setting or value. In an embodiment, the second instruction, after being defined, may be stored in computing device memory. In an example, the second instruction may prescribe an action of communicating a warning to a user if the feature is present and not set to a particular setting or value. In another example, the second instruction may call for an action of disabling a computing device, e.g. by the shutting the device down or disconnecting the device from a network, if the feature is present and not set to a setting or value that is consistent with the applicable security policy.

Instruction module 20 is additionally configured to define a third instruction that prescribes or orders an action to be taken if the feature is not present. In an embodiment, the second instruction, after being defined, may be stored in computing device memory. As used in this specification and the appended claims, a feature is "not present" in a particular computing device if the feature is missing from or not supported by that computing device. The feature may be missing from the computing device by reason of having been disabled, removed, or due to a performance error in the feature that renders it nonfunctional. In an example, the third instruction may prescribe an action of listing, noting or highlighting the absence of the feature in the next scheduled report of security issues for the network. In another example, the third instruction may order that "no action" be taken if the feature is not present, as the absence of the feature is not deemed a significant security risk.

In an embodiment, defining the first, second and/or third instruction includes receiving the instruction from a user via the user's interaction with a software application. In another embodiment, the first, second, and/or third instruction is received from a software application configured to recommend device settings without user involvement.

In an embodiment, the instruction module 20 is configured to provide a user with first, second and/or third instruction options or choices that the user may select from. In an embodiment, the instruction module 20 may cause a presentation to a user, via a graphic user interface, of a drop down menu for a first instruction that describes a setting or value that a feature of the computing device should be set to. Instruction options or choices for an example feature may include "enable", "disable", "enable with encryption", or "enable without encryption". In an example, the instruction module 20 may cause a presentation to a user, via a graphic user interface, of radio button alternatives for a second instruction, the instruction options or choices including "report only", "communicate warning", "disable second feature", and/or "disconnect second printer from network" if the feature is present but not set to the correct setting or value.

In another example, the instruction module may be configured to present a user, via a graphic user interface, a drop down menu for user selection of a third instruction that is applicable when the feature is not present. Third instruction options or choices that may be presented to user may include directions to "report only", "communicate warning of missing feature", "disable non-compliant computing device", "disconnect non-compliant computing device from network", and/or "ignore non-compliant computing device".

Data module 22 represents generally any combination of hardware and programming configured to determine whether the feature is present in a computing device, and if present, whether the feature is set to the correct setting or value. In an embodiment, the determining occurs in response to a specific user-directed query. In another embodiment, the determining occurs in response to a scheduled query that is initiated by a security management application, wherein the frequency and timing of the queries are directed by a user. In an embodiment, the determining comprises receiving and utilizing data that is indicative of whether the feature is present, and if present, whether the feature is set to the setting. In an embodiment, network protocols such as HTTP (Hypertext Transfer Protocol) and SNMP (Simple Network Management Protocol) may be utilized in requesting and receiving the data. In an embodiment, the data is received and stored in memory, as part of an archived security record for the fleet of devices.

Initiation module 24 represents generally any combination of hardware and programming configured to initiate the first action if the feature is present and not set to the value, and to initiate the second action if the feature is not present. In embodiments, the initiation module 24 includes or operates in conjunction with a presentation device, such that a warning can be communicated to a user as part of a first action or second action. In embodiments, the initiation module 24 includes or operates in conjunction with a disabling device or disabling application, such that a computing device or feature can be disabled or disconnected from a network as part of the first action or the second action. In embodiments, the initiation module 24 includes or operates in conjunction with a reporting application or module, such that a report can be prepared, for presentation to a user or a system to summarize security issues as part of the first action or the second action.

Figure 3:
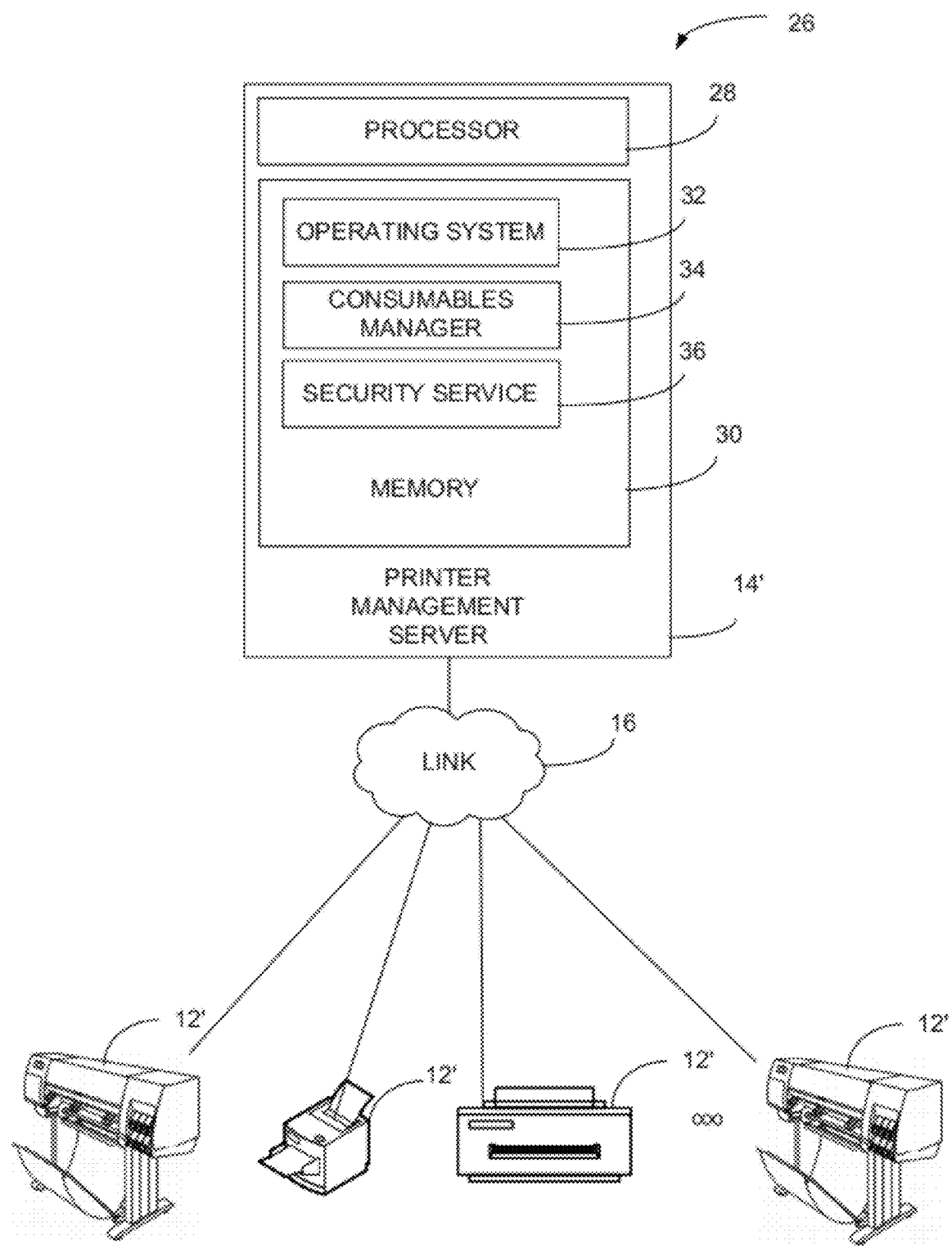
FIG. 3 depicts an implementation of the security manager of FIG. 2 according to an embodiment.

Security manager 18 may be implemented in a number of environments, such as environment 26 of FIG. 3. Environment 26 includes a plurality of printer computing devices (hereinafter "printers") 12' and a printer management server 14', interconnected via link 16. Printers 12' may be a heterogeneous group of printers that is made up of different printer models, the models containing varying mixes or combinations of features.

Printers 12' represent generally computing devices capable of receiving print jobs from a host, producing printed output from the print jobs, and communicating information relating to the received print jobs and/or the printed output back to the host. In particular, printers 12' utilize imaging material such as ink or toner to form a desired image on a print medium.

In an embodiment, a printer management server 14' is shown to include processor 28 and a memory 30. Processor 28 represents generally any device capable of executing program instructions stored in memory 30. Memory 30 represents generally any memory configured to store program instructions and other data. Memory 30 is shown to include operating system 32, consumables manager 34 and security service 36. The processor 28 may represent multiple processors, and the memory 30 may represent multiple memories. Operating system 32 represents generally any software platform on top of which other programs or applications such as the managing service 36 run. Examples include Linux® and Microsoft Windows®. Consumables manager 34 represents generally any combination of hardware and software capable of monitoring and managing media, ink, and/or toner supplies and other operations relating to consumables within a fleet of printer computing devices. In an embodiment, consumables manager 34 may be configured to monitor that status of consumables within printers 12' and send a message to a user, via a printer display screen or an attached computing device, that supplies are low or exhausted, as applicable. In another embodiment, consumables manager 34 may be configured to track the usage of consumables within a printer, and periodically send reports to a user summarizing such usage.

Security service 36 in combination with operating system 32 represent generally any combination of hardware and programming that, when executed, implements the functionality of the security manager 18 of FIG. 2. In particular, security service 36, when executed by processor 28, is responsible for defining a first instruction, the first instruction prescribing or ordering a setting or value that a feature should be set or assigned to if the feature is present in a computing device. A second instruction is defined, the second instruction prescribing or ordering an action to be taken if the feature is present and not set to the setting or value. A third instruction is defined, the third instruction prescribing or ordering an action to be taken if the feature is not present. In an embodiment, the first, second and/or third instruction, after being defined, may be stored, in computing device memory. In an embodiment, defining the first, second and/or third instruction comprises receiving the instruction from a user via the user's interaction with a software application. In an embodiment, the security service 36 is configured to provide a user with first, second and/or third instruction options or choices that the user may select from. It is determined whether the feature is present, and if present, whether the feature is set to the correct setting or value. The first action is initiated if the feature is present and not set to the value in a computing device. The second action is initiated if the feature is not present. In an embodiment, data is received that is indicative of whether the feature is present in a plurality of computing devices, and if present, whether the feature is set to the correct setting or value.

Environment 26 is but one example implementation of the functionality of the security manager 18 of FIG. 2. Environment 26 illustrates a security service 36 within a printer management server 14', operable to secure a fleet of printers. In other embodiments, a security service, that when executed implements the functionality of the security manager 18 of FIG. 2, may be incorporated in a first computing device that is operable to secure additional computing devices other than printers, including but not limited to desktop computers, laptop computers, smart phones, cell phones, digital tablet computers, personal digital assistants, net-books, digital media players, and/or scanners.

In the foregoing discussion, various components were described as combinations of hardware and programming. Such components may be implemented in a number of fashions. In one example, the programming may be processor executable instructions stored on tangible memory media and the hardware may include a processor for executing those instructions. Thus, certain elements operating on the same device may share a common processor and common memory media.

Figure 4:
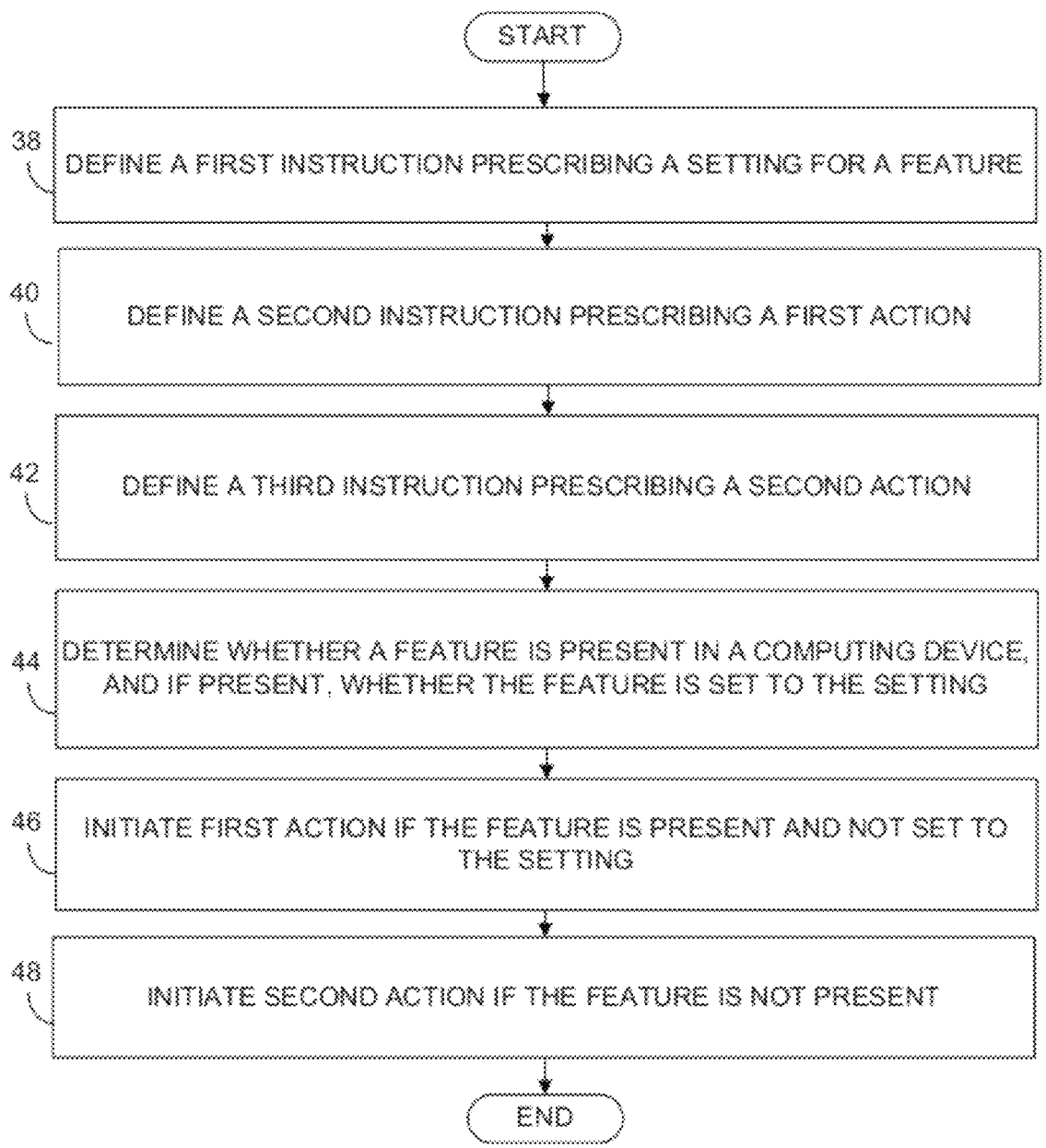
FIGS. 4-5 are flow diagrams depicting steps taken to implement various embodiments.
Figure 5:
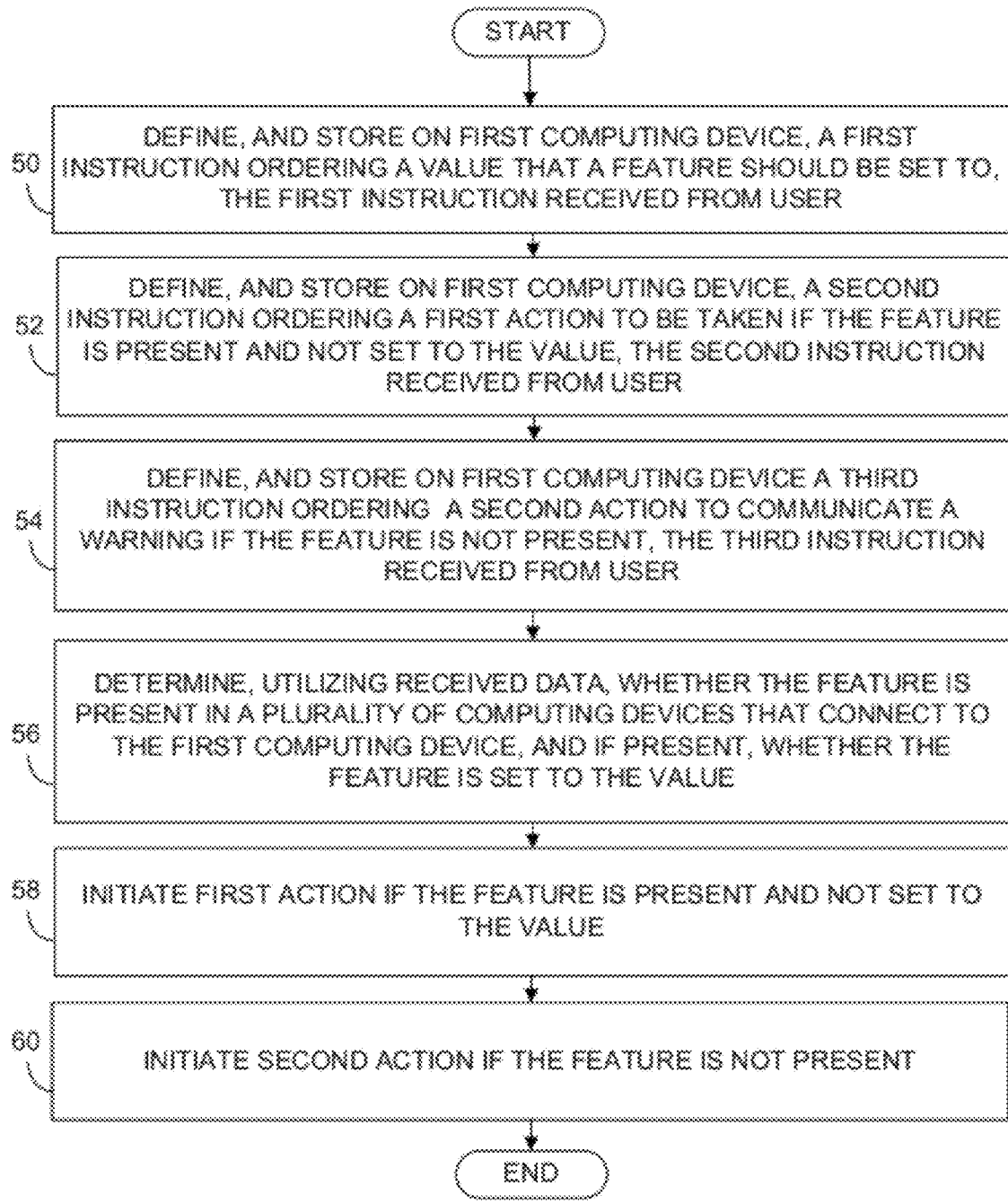

OPERATION: FIGS. 4 and 5 are example flow diagrams of steps taken to implement a method to secure a computing device, in accordance with an embodiment. In discussing FIGS. 4 and 5, reference may be made to the diagrams of FIGS. 1-3 to provide contextual examples. Implementation, however, is not limited to those examples.

Starting with FIG. 4, a first instruction is defined, the first instruction prescribing a setting for a feature (block 38). Referring back to FIG. 2, the instruction module 20 may be responsible for implementing block 38. In an embodiment, the feature is a characteristic of software, the software residing upon and capable of running on a computing device. In an embodiment, the feature is a characteristic of hardware of a computing device. In an embodiment, the feature is a characteristic of a combination of hardware and software. For example, an instruction to disable a communication port feature may be an instruction that relates to both hardware and software of a computing device.

Continuing with the flow diagram of FIG. 4, a second instruction is defined, the second instruction prescribing a first action to be taken if the feature is present and not set to the setting (block 40). Referring back to FIG. 2, the instruction module 20 may be responsible for implementing block 40. In an example, the second instruction may prescribe an action of describing the incorrect setting information in a report to be sent to a user, immediately communicating a warning to a user, disconnecting a computing device from a network, and/or disabling a computing device.

Continuing with the flow diagram of FIG. 4, a third instruction is defined, the third instruction prescribing a second action to be taken if the feature is not present (block 42). Referring back to FIG. 2, the instruction module 20 may be responsible for implementing block 42. In examples, the prescribed second action may be to include a description of the missing feature in a report, to communicate a warning to a user, to disconnect a computing device from a network, and/or to disable a computing device. In another example, the prescribed second action may be to take ignore, e.g. "take no action" with respect to the missing feature.

In an embodiment, the first, second and/or third instruction, after being defined, may be stored in computing device memory. In an embodiment, defining the first, second, and/or third instruction comprises receiving the applicable instruction from a user via the user's interaction with a software application. In another embodiment, the first, second, and/or third instruction is received from a software application.

In an embodiment, a user is presented with a set of options for the first, second and/or third instructions, and the first, second and/or third instructions are received from the user via the user's selection from the set or sets of options. In an embodiment, the set or sets of options are presented to the user via a graphic user interface. In embodiments, the set or sets of options may be presented to the user in the form of drop down menus or radio button alternatives.

Continuing with the flow diagram of FIG. 4, it is determined whether the feature is present in a computing device, and if present, whether the feature is set to the setting (block 44). Referring back to FIG. 2, the data module 22 may be responsible for implementing block 44. In an embodiment, the determination is made in response to a specific user-directed query. In another embodiment, the determination is made in response to a scheduled query that is initiated by a security management application, wherein the frequency and timing of the queries are directed by a user.

Continuing with the flow diagram of FIG. 4, the first action is initiated if the feature is present and not set to the setting (block 46). Referring back to FIG. 2, the initiation module 24 may be responsible for implementing block 46. In an example, initiation of the first action may include communicating a warning to a user utilizing a presentation device such as a display screen, monitor or audio speakers.

Continuing with the flow diagram of FIG. 4, the second action is initiated if the feature is not present (block 48). Referring back to FIG. 2, the initiation module 24 may be responsible for implementing block 48. In an example, initiation of the second action may include disabling a computing device's connection to a network. In another example, the second action may include shutting down a computing device. In another example, the second action may include noting the absence of the feature within a report of security issues to be presented to a user.

Moving on to FIG. 5, in a particular implementation, a first instruction is defined and stored on a first computing device, the first instruction ordering a value that a feature should be set to (block 50). Referring back to FIG. 2, the instruction module 20 may be responsible for implementing block 50. In an embodiment the first instruction is received from a user.

Continuing with the flow diagram of FIG. 5, a second instruction is defined and stored on the first computing device, the second instruction ordering a first action to be taken if the feature is present and not set to the value (block 52). Referring back to FIG. 2, the instruction module 20 may be responsible for implementing block 52. In an embodiment, the second instruction is received from a user after presentation to the user of a set of second instruction choices, and the received second instruction is comprised within the set of presented choices.

Continuing with the flow diagram of FIG. 5, a third instruction is defined and stored on the first computing device, the third instruction ordering a second action to communicate a warning if the feature is not present (block 54). Referring back to FIG. 2, the instruction module 20 may be responsible for implementing block 54. In an embodiment, the third instruction is received from a user after presentation to the user of a set of third instruction choices, and the received third instruction is comprised within the set of presented choices.

Continuing with the flow diagram of FIG. 5, it is determined utilizing received data whether the feature is present in a plurality of computing devices that connect to the first computing device, and if present, whether the feature is set to the value (block 56). Referring back to FIG. 2, the data module 22 may be responsible for implementing block 56. In an embodiment, the data is received and then stored in memory as part of an archived security record for the fleet of devices.

Continuing with the flow diagram of FIG. 5, the first action is initiated if the feature is present and not set to the value in one of the plurality of computing devices (block 58). Referring back to FIG. 2, the initiation module 24 may be responsible for implementing block 58.

Continuing with the flow diagram of FIG. 5, the second action is initiated if the feature is not present in one of the plurality of computing devices (block 60). Referring back to FIG. 2, the initiation module 24 may be responsible for implementing block 60.

Figure 6:
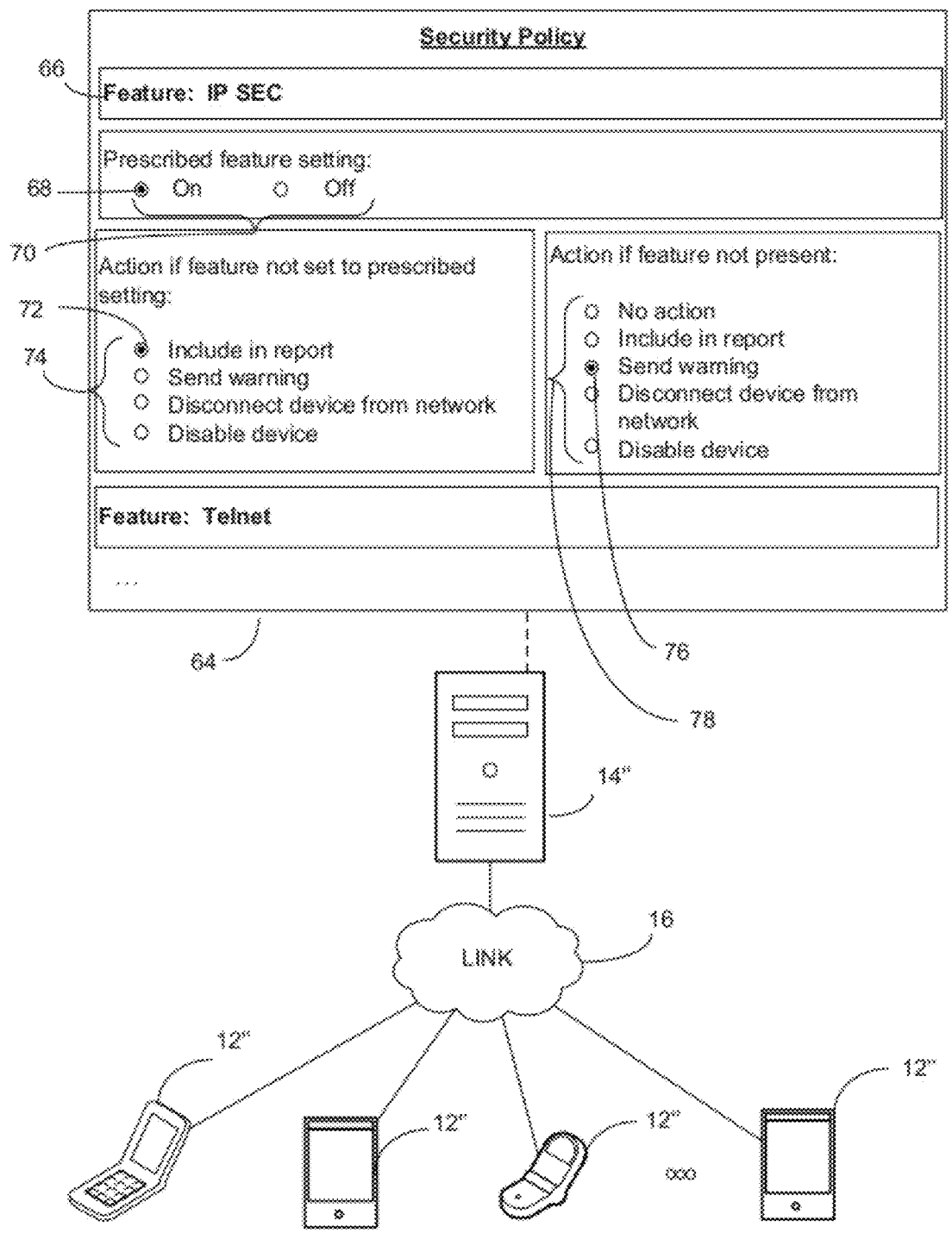
FIGS. 6 and 7 depict example implementations of the disclosed method and system to secure a computing device.
Figure 7:
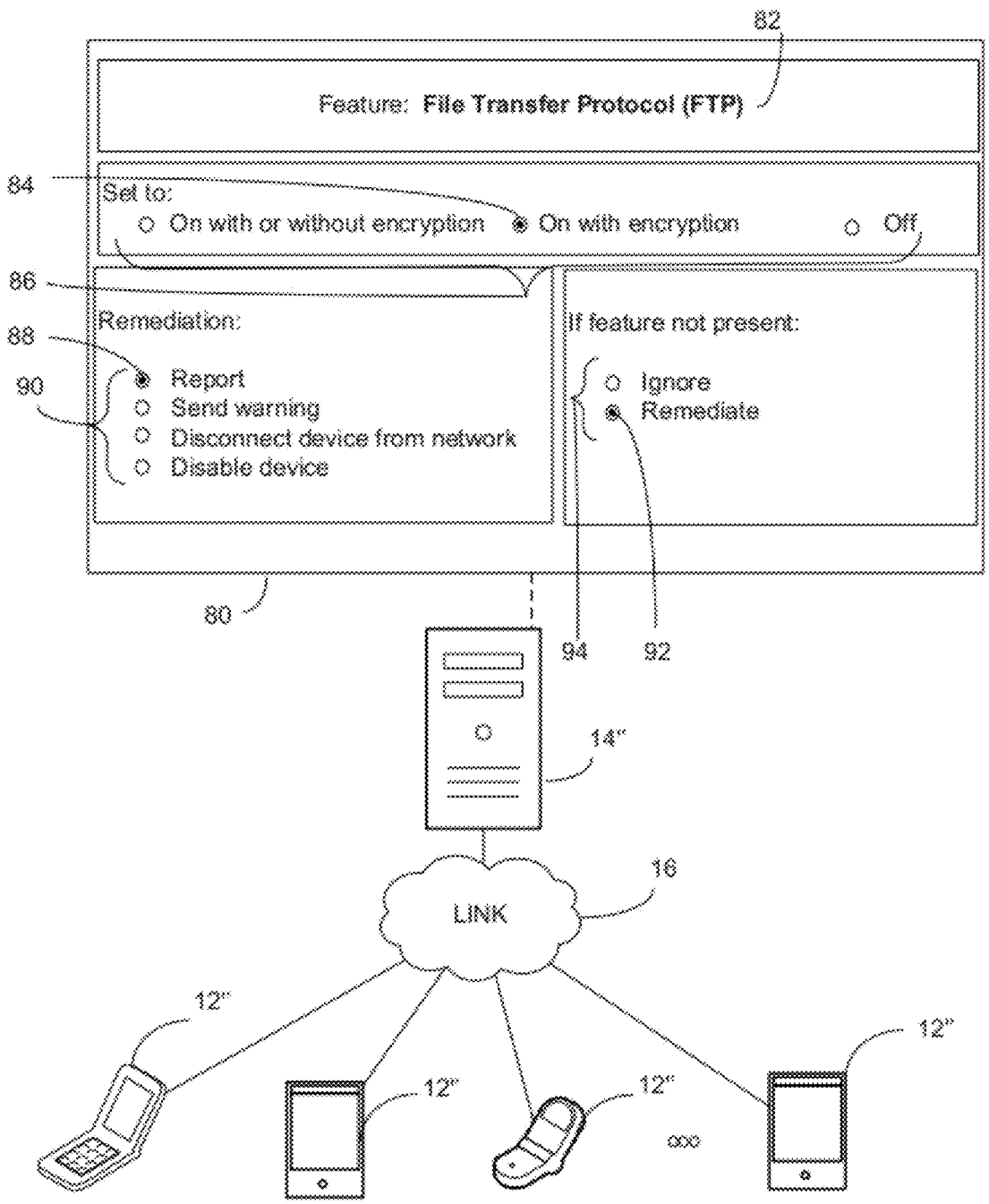

EXAMPLES: The diagrams of FIGS. 6 and 7 provide example implementations of a method and system to secure a computing device. A plurality of smart phone computing devices 12" and a configuration management server 14" are interconnected via a link 16. Smart phones 12" may be a heterogeneous group of smart phones that is made up of different printer models, the models containing varying mixes or combinations of features.

In other embodiments the illustrated smart phones 12" could be any computing devices capable of communicating with the configuration management server 14" via the link 16. The smart phones 12" may include a user interface and a presentation device. In some examples, the presentation device and the user interface may be one apparatus, e.g. a touchscreen display/interface.

In this example, configuration management server 14" includes a processor and memory similar to the processor 28 and memory 30 depicted in the management server 14' of FIG. 3, with a difference that memory included in configuration management server 14" includes a usage manager, module rather than a consumables manager 34 (FIG. 3). In an embodiment, the usage manager module may create a call history for the smart phones, track actual usage against an applicable usage plan, and create reports summarizing usage of the smart phones 12". Configuration management server 14" includes a security service similar to the security service 36 of FIG. 3, the security service comprising a combination of hardware and programming that, when executed, implements the functionality of the security manager 18 of FIG. 2.

Screen shot 64 illustrates an embodiment of the disclosed method and system to secure a computing device. In this example, a user is presented, via a "radio button" graphic user interface, with sets of options for first, second and third instructions that the user may select from. In other embodiments, the sets of options for the first, second and/or third instructions may be presented to the user utilizing a drop down menu graphic user interface or some other format other than radio button format. The first, second and third instructions relate to an "Internet Protocol Security" ("IP SEC") feature 66 and are to be selected by the user and received by the security service that runs on the configuration management server 14". In this example, IP SEC is a feature that may include a suite of protocols used for authenticating and encrypting packets in a data stream. In this example, IP SEC may also include protocols for cryptographic key establishment. In some implementations, a computing device that has IP SEC enabled may not communicate with another computing device unless that device also enables an IP SEC feature and utilizes matching credentials.

The first instruction 68 is an instruction prescribing a setting for a feature. Here a user has selected from a set of options 70 including "On" and "Off", a first instruction 68 ("On") to prescribe that the IP SEC feature 66 should be turned on, or enabled. After receipt of the first instruction 68 from the user, the first instruction 68 is defined within the security service running on configuration management server 14".

The second instruction 72 is an instruction prescribing an action to be taken if the IP SEC feature 66 is not set to the prescribed "On" setting in one of the connected smart phones 12". In this example, a user may select from the following second instruction options 74: "include in report", "send warning", "disconnect device from network" and "disable device". In this example, the user has selected "include in report" as the second instruction 72. After receipt of the second instruction 72 from the user, the second instruction 72 is defined within the security service running on configuration management server 14".

The third instruction 76 is an instruction prescribing an action to be taken if IP SEC 66 feature is not present in a connected smart phone 12". In this example, a user may select from the following third instruction options 78: "no action", "include in report", "send warning", "disconnect device from network" and "disable device". In this example, the user selected "send warning" as the third instruction 76. After receipt of the third instruction 76 from the user, the third instruction 76 is defined within the security service running on configuration management server 14".

Configuration management server 14" determines, utilizing received data, whether the IP SEC feature 66 is present in a plurality of smart phones 12" that are connected to the configuration management server 14" by link 16, and if present, whether the IP SEC feature 66 is turned to the prescribed "On" setting. In an embodiment, network protocols such as HTTP (Hypertext Transfer Protocol) and SNMP (Simple Network Management Protocol) may be utilized in requesting and receiving the data. The data may be received in response to a specific user-directed query, or in response to a scheduled query that is initiated by the configuration management server 14".

The first action to "include in report" is initiated if the IP SEC feature 66 is found to be present and not set to the prescribed "On" setting in one of the plurality of connected smart phones 12". In an example, the report may be a report of security issues that is sent to a user on a regular basis, such that the reporting with respect to the IP SEC feature is not immediate.

The second action to "send warning" is initiated if the IP SEC feature is found to be not present in one of the plurality of connected smart phones 12". In an example, the security service running on configuration management server 14" may immediately send a warning to a user via a display device, via an email message, via audio speakers or otherwise. As described previously, the IP SEC feature 66 may be absent as the result of the IP SEC feature 66 having been disabled, removed, or due to a performance error in the feature that renders it nonfunctional. In this embodiment, the security service running on the configuration management server 14" treats the absence of the IP SEC feature 66 the same regardless of what causes the feature to be missing.

Moving to FIG. 7, screen shot 80 illustrates another embodiment of the disclosed method and system to secure a computing device. In this example, a user is presented, via a "radio button" graphic user interface, with sets of choices for first, second and third instructions that the user may select from, the instructions relating to a "File Transfer Protocol" ("FTP") feature 82. A first, a second and a third instruction are to be selected by the user and received by a security service that runs on the configuration management server 14". In this example, FTP is a feature that enables a network protocol used to copy a file from one host to another over a TCP/IP-based network, such as the internet. In this example the FTP feature 82 can be set to run utilizing encryption, or without utilizing encryption. Also, in this example the FTP feature 82 may be turned off in a particular smart phone device 12".

The first instruction 84 is an instruction prescribing a setting that a feature should be set to. Here a user has selected a first instruction "On with encryption" 84 from a set of instruction choices 86 including "On with or without encryption" and "On with encryption" and "Off". After receipt of the first instruction 84 from the user, the first instruction 84 is defined within and stored at the security service running on configuration management server 14".

The second instruction 88 is an instruction prescribing a first action to be taken if the FTP feature 82 is not set to the prescribed "On with encryption" setting in one of the connected smart phones 12". In this example, a user may select from the following remediation instructions 90: "report", "send warning", "disconnect device from network" and "disable device". In this example, the user has selected a second instruction 88 to "report" if a connected device is found to have an FTP feature that is not set to "On with encryption". After receipt of the second instruction 88 from the user, the second instruction 88 is defined within and stored at the security service running on configuration management server 14".

The third instruction 92 is an instruction prescribing a second action to be taken if the FTP feature 82 is not present in a connected smart phone 12". In this example, a user may select from the following third instruction choices 94: "ignore" and "remediate". In this example, the user selected "remediate" as the third instruction 92. In this embodiment the third instruction follows or replicates the user-selected second instruction 88 as to the specifics as for remediation, so a third instruction 92 to "remediate" causes a report to be generated if the FTP feature 82 is not present. After receipt of the third instruction 92 from the user, the third instruction 92 is defined within and stored at the security service running on configuration management server 14".

Configuration management server 14" determines, utilizing received data, whether the FTP feature 82 is present in a plurality of smart phones 12" that are connected to the configuration management server 14" by link 16, and if present, whether the FTP feature is turned to the prescribed "On with encryption" setting.

The first action to "report" is initiated if the FTP feature 82 is found to be present and not set to the "On with encryption" setting in any of the plurality of connected smart phones 12".

The second action to "remediate" is initiated if the FTP feature 82 is found to be not present in one of the plurality of connected smart phones 12". As discussed previously, in this example the third instruction 92 follows or replicates the second instruction 88 as to the specifics as for remediation, such that initiation of the second action causes a report to be generated.

CONCLUSION: The diagram of FIG. 1 is used to depict an example environment in which various embodiments may be implemented. Implementation, however, is not so limited. FIGS. 2 and 3 show the architecture, functionality, and operation of various embodiments. Various components illustrated in FIGS. 2 and 3 are defined at least in part as programs. Each such component, portion thereof, or various combinations thereof may represent in whole or in part a module, segment, or portion of code that comprises executable instructions to implement any specified logical function(s). Each component or various combinations thereof may represent a circuit or a number of interconnected circuits to implement the specified logical function(s).

Also, the present disclosure may be embodied in any computing device-readable media for use by or in connection with an instruction execution system such as a computing device/processor based system or an ASIC (Application Specific Integrated Circuit) or other system that can fetch or obtain the logic from computing device-readable media and execute the instructions contained therein. "Computing device-readable media" can be any media that can contain, store, or maintain programs and data for use by or in connection with the instruction execution system. Computing device readable media can comprise any one of many physical media such as, for example, electronic, magnetic, optical, electromagnetic, or semiconductor media. More specific examples of suitable computing device-readable media include, but are not limited to, a portable magnetic computing device diskette such as floppy diskettes or hard drives, a random access memory (RAM), a read-only memory (ROM), an erasable programmable read-only memory, or a portable compact disc.

Although the flow diagrams of FIGS. 4 and 5 show specific orders of execution, the order of execution may differ from that which is depicted. For example, the order of execution of two or more blocks may be scrambled relative to the order shown. Also, two or more blocks shown in succession may be executed concurrently or with partial concurrence. All such variations are within the scope of the present disclosure.

The preceding description has been presented only to illustrate and describe embodiments and examples of the principles described. This description is not intended to be exhaustive or to limit these principles to any precise form disclosed. Many modifications and variations are possible in light of the above teaching.

What is claimed is:

1. A non-transitory computer-readable storage medium containing instructions to cause a processor to:
define:
a first instruction prescribing a setting for a feature of a computing device, the setting for the feature corresponding to a configuration of the feature in accordance with a security policy for securing the computing device,
a second instruction prescribing a first action,
receive data from the plurality of computing devices including the computing device, wherein the data indicates whether the feature is present in each of the plurality of computing devices, and if present, whether the feature is set to the setting,
determine, from the received data for the computing device, whether the feature is present in the computing device, and if present, whether the feature is set to the setting;
initiate the first action if the feature is present in the computing device but is not set to the setting, such that the first action is performed where the feature is present but the configuration thereof is not in accordance with the security policy; and
take no action if the feature is not present in the computing device such that absence of the feature is ignored.

2. The medium of claim 1, wherein the first instruction is an instruction received from a user.

3. The medium of claim 1, wherein the second instruction is an instruction received from a user.

4. The medium of claim 1, wherein the second instruction comprises communicating a warning.

5. The medium of claim 1, wherein the computing device comprises a printer.

6. A system comprising a processor and a memory, the processor to execute instructions stored in the memory, wherein the memory stores instructions in the form of an instruction module, a data module, and an initiation module:
the instruction module, when executed, is to define
a first instruction prescribing a setting for a feature of a computing device, the setting for the feature corresponding to a configuration of the feature in accordance with a security policy for securing the computing device,
a second instruction prescribing a first action,
the data module, when executed, is to
receive data from a plurality of computing devices including the computing device, wherein the data indicates whether the feature is present in each of the plurality of computing devices, and if present, whether the feature is set to the setting, and
determine, from the received data for the computing device, whether the feature is present in the computing device, and if present, whether the feature is set to the setting; and
the initiation module when executed is to
initiate the first action if the feature is present and not set to the setting, such that the first action is performed where the feature is present but the configuration thereof is not in accordance with the security policy; and
take no action if the feature is not present in the computing device such that absence of the feature is ignored.

7. The system of claim 6, wherein the setting includes an option to communicate a warning.

8. The system of claim 6, wherein the setting includes an option to disable the computing device.

9. The system of claim 6, wherein the setting includes an option to take no action.

10. A computing device readable non-transitory medium storing computing device executable instructions that when executed implement a method comprising:
defining:
a first instruction ordering that a feature be set to a value, the feature of a computing device, the value for the feature corresponding to a configuration of the feature in accordance with a security policy for securing the computing device, a second instruction ordering a first action;
receiving data from a plurality of computing devices including the computing device, wherein the data indicates whether the feature is present in each of the plurality of computing devices, and if present, whether the feature is set to the value;
determining, from the received data for the computing device, whether the feature is present in the computing device, and if present, whether the feature is set to the value;
initiating the first action if the feature is present and not set to the value in the computing device, such that the first action is performed where the feature is present but the configuration thereof is not in accordance with the security policy; and
take no action if the feature is not present in the computing device such that absence of the feature is ignored.

11. The medium of claim 10, wherein the computing device comprises a smart phone.

12. The medium of claim 1, wherein the first instruction is an instruction received from a software application to recommend settings, and a third instruction is received as a result of user interaction with the software application.

13. The medium of claim 1, wherein the feature is a distinguishing characteristic or attribute of one or more of software and hardware of the computing device.

* * * * *

UNITED STATES PATENT AND TRADEMARK OFFICE
CERTIFICATE OF CORRECTION

PATENT NO. : 9,021,545 B2
APPLICATION NO. : 12/873230
DATED : April 28, 2015
INVENTOR(S) : Matthew Deter et al.

It is certified that error appears in the above-identified patent and that said Letters Patent is hereby corrected as shown below:

On the title page, item 73, Assignee, in column 1, line 2, delete "Houstion" and insert -- Houston --, therefor.

Signed and Sealed this
Fourteenth Day of June, 2016

Michelle K. Lee
*Director of the United States Patent and Trademark Office*